United States Patent [19]

Whitfill et al.

[11] Patent Number: 5,012,869

[45] Date of Patent: May 7, 1991

[54] METHOD FOR RESTRICTING GAS INFLUX DURING WELL CEMENTING

[75] Inventors: Donald L. Whitfill; Lee E. Whitebay, both of Ponca City, Okla.

[73] Assignee: Conoco Inc., Ponca City, Okla.

[21] Appl. No.: 592,747

[22] Filed: Oct. 3, 1990

[51] Int. Cl.$^5$ ............................................. E21B 33/14
[52] U.S. Cl. ..................................... 166/285; 166/292
[58] Field of Search .................... 166/285, 291, 292, 166/281

[56] References Cited

U.S. PATENT DOCUMENTS 4,428,424 1/1984 Lacy et al. ........................... 166/253
4,600,056 7/1986 Burton, Jr. .......................... 166/291
4,951,921 8/1990 Stahl et al. ........................... 166/270

FOREIGN PATENT DOCUMENTS 89302558.5 9/1989 European Pat. Off. .

Primary Examiner—William P. Neuder
Attorney, Agent, or Firm—Richard W. Collins

[57] ABSTRACT

A method of forming a flow-restricting layer on a wellbore surface prior to cementing a casing string in the wellbore. The flow-restricting layer is formed by reaction of an injected fluid with divalent ions at and near the wellbore surface. The injected fluid is a composition containing a water-soluble polymer and one or more potassium salts.

5 Claims, No Drawings

METHOD FOR RESTRICTING GAS INFLUX DURING WELL CEMENTING

BACKGROUND OF THE INVENTION

1. Field of the Invention

This invention relates to well cementing operations, and more particularly to a method of restricting influx of formation gas into a wellbore during primary cementing of a wellbore penetrating a potentially hydrocarbon-producing subterranean formation. Restricting gas influx into the wellbore helps achieve a good cement job by reducing the likelihood that gas channels will form in the cement before it is completely set. Channeling allows cross-flow between zones, often requiring correction by expensive cement squeeze jobs before the wells can be efficiently put on production. Another problem that sometimes occurs in cementing operations is that water in the cement slurry sometimes flows out into the formation, causing dehydration of the cement slurry. Cement dehydration can result in premature bridging of the cement slurry and lead to channeling and/or weak cement.

It is common practice in drilling wellbores into potentially hydrocarbon-producing subterranean formations to extend a casing or liner down the wellbore through the potential producing zone and then to cement the casing or liner in place by pumping cement down the wellbore and up the annulus formed by the outside of the casing or liner and the borehole wall, at least over the portion of the wellbore extending through the potential producing zone. The cement is maintained in the annulus, usually at a balanced or slightly overbalanced pressure relative to the formation pressure, until the cement hardens. The well is then completed by installation of a production tubing and by perforating the casing or liner and the cement between the casing or liner and the formation to provide a fluid path between the formation and the production tubing.

In actual operations, it is sometimes difficult to maintain the desired balance of pressure, and an influx of formation gas before the cement hardens can result in channeling in the cement. Channeling is undesirable for several reasons, and usually requires a remedial cement squeeze job, with resulting delays and added expenses.

2. The Prior Art

Sodium silicate solutions have been used to form a barrier to water intrusion in wells, as described in U.S. Pat. No. 4,428,424. However, prior to this invention, no process was available to reliably control formation gas influx and at the same time prevent premature dehydration of cement.

European Patent Application No. 89302558.2 describes shale-stabilizing drilling fluid additives which are similar in many respects to the skin-forming materials useful in carrying out the process of the present invention.

SUMMARY OF THE INVENTION

According to the present invention, gas influx during primary cementing of a wellbore penetrating a potentially hydrocarbon-producing subterranean formation is restricted by contacting the wellbore wall with a material which reacts with divalent ions (naturally present or added) present in the formation to form a skin at and near the wellbore surface, thereby forming a barrier to gas influx and to outflow of water from the cement. The skin-forming material is an aqueous solution of a polymer/salt composition as described in more detail below. The thus-formed skin at the borehole wall restricts influx of formation gas, thereby reducing formation of channels in the unset cement and reducing water loss from the cement into the formation.

DESCRIPTION OF THE PREFERRED EMBODIMENT

The flow barrier formed at and near the wellbore surface is created by contacting at least the portion of the wellbore wall penetrating a potentially hydrocarbon-producing formation with an aqueous solution of a polymer/salt composition which is reactive with divalent ions normally present in formation water to form a flow-restricting skin at the wellbore surface.

The skin-forming fluids useful in the present invention consist essentially of one or more water-soluble polymers combined with one or more alkaline potassium salts in wide-ranging ratios effective to give a composition having a pH of at least 9. The water-soluble polymer or polymers of this invention are of relatively high molecular weight and are capable of forming nucleophilic sites when treated with a base. The potassium salt or salts are those whose anions are relatively strong Bronsted-Lowry bases; i.e., give a pH of 9 or above in the presence of an aqueous solution of the polymer, but are relatively weak nucleophiles compared to the polymeric nucleophilic sites.

The weight ratio of polymer:potassium salt should generally be in the range between about 1:20 and about 3:1. A generally preferred ratio is one in the range between about 1:2 and about 2:1. The polymer/potassium salt composition should be used in a concentration sufficient to react with divalent ions present at the wellbore surface to form a flow-restricting barrier at the wellbore wall. The upper limit on the polymer/salt content of the fluid is one of practicality. Usually the polymer/salt composition is added to the fluid at a level between about 0.01 weight percent and 10.0 weight percent (based on the weight of the aqueous phase), typically between about 0.1 and about 4.0 weight percent, and preferably between about 0.3 and about 2.0 weight percent.

The polymers useful for the purposes of this invention must be:
a. water-soluble,
b. capable of forming several nucleophilic sites within the same molecule when treated with bases, and
c. of relatively high molecular weight.

The polymers useful in this invention must not only be water-soluble but they should also have good wetting properties and a reasonable rate of dissolution in water for convenient use in the field. They should also afford aqueous solutions of low to moderate viscosities. The polymers useful in this invention must be polyfunctional and be capable of forming relatively strong nucleophilic sites when treated with bases, particularly in comparison with the potassium salts used in the fluids.

The polymers useful in this invention must have a relatively high molecular weight. While the exact molecular weights will vary from polymer to polymer, it is a parameter that can be determined empirically. Hydrolyzed vinyl acetate homopolymers having number average molecular weights ($M_n$) of about 46,000 or below, represented by ELVANOL 90-50 and ELVANOL 71-30, while giving some skin-forming effect, are substantially less effective than those of higher molecular weight. ELVANOL HV hydrolyzed vinyl acetate homopolymer, $M_n$ of about 75,000, used as is or crosslinked with glutaraldehyde to increase the $M_n$ to about 190,000, is more effective. The ELVANOL products referred to herein are available from E. I. du Pont de Nemours and Company.

The polymers of choice for purposes of the invention are partially hydrolyzed polymeric vinyl acetate (PHPVA) homo- and copolymers. In general, the homopolymers should be at least 75 mol percent hydrolyzed to the corresponding polyvinyl alcohols and have an $M_n$ of 50,000 or more. In practice, the vinyl acetate homopolymer can be hydrolyzed to about 98 to 99 percent. However, as that upper practical limit is approached, the polymer becomes more crystalline and, as a consequence, less soluble in water, requiring heat to dissolve it. PHPVA which is about 87 or higher mol percent hydrolyzed is the most soluble in water. The only constraint on molecular weight is water-solubility. In a preferred embodiment, a vinyl acetate homopolymer which has been hydrolyzed about 87 percent is used.

In another preferred embodiment, a vinyl acetate copolymer is used. In the latter embodiment, the vinyl acetate portion of the copolymer can be hydrolyzed as fully as possible (about 98 to 99 percent) without loss of water-solubility. The presence of copolymer units derived from monomers other than vinyl acetate inhibits crystallization and thereby promotes water-solubility. Representative comonomers include acrylic and methacrylic acids, amides such as acrylamide and methacrylamide, and alkyl methacrylonitrile and acrylonitrile. The amount of the comonomer used with vinyl acetate will vary with the identity of the comonomer. However, that amount can be determined empirically by using enough to provide the degree of water-solubility desired in the copolymer. For example, vinyl acetate copolymers can be prepared from the preferred comonomer, acrylic acid, using monomer mixtures containing 14 to 39 mol percent (preferably 20 to 35 mol percent) acrylic acid.

Other polymers suitable for the purposes of this invention include partially (about 30 percent) hydrolyzed polyacrylamide which also contains potassium chloride; carboxymethyl hydroxyethyl celluloses having an $M_n$ of between about 350,000 and 500,000; hydroxyethyl celluloses having an $M_n$ of about 200,000; hydroxypropyl methyl celluloses having an $M_n$ of from about 300,000 to 1,000,000; and hydroxy-propyl guar having an $M_n$ of about 600,000.

One or more potassium salts are used with the polymers in the process of this invention. The anions of the potassium salts must be relatively strong Bronsted-Lowry bases, but they should be relatively weak nucleophiles in comparison with the nucleophilic sites on the polymers. The potassium salts should be sufficiently alkaline so as to raise the pH to above 9.0 and to buffer it, at least temporarily, at a pH of at least 9.0. A pH range of 9.0 to 13.0 is suitable, with a pH range of 10.5 to 11.5 being preferred. It is technically feasible to operate at pH values between 11.5 and 13.0. However, such high pH values are somewhat less acceptable with respect to exposure of personnel in the field. A number of inorganic salts are suitable for use in conjunction with the polymers. Potassium silicate, potassium carbonate, and tribasic potassium phosphate may be used. The anions of these salts are all fairly strong Bronsted-Lowry bases and fairly week nucleophiles.

Potassium silicates can be obtained commercially in a variety of $SiO_2$ to $K_2O$ ratios. Those having a $SiO_2/K_2O$ ratio in the range of about 0.5 to 2.5 are suitable for use in the present invention. However, the range of about 1.5 and 2.2 is preferred. When potassium silicates in the preferred range are included, the resultant fluids are very effective. Moreover, these types of potassium silicates are not expensive and do not tend to absorb moisture during storage or handling.

Water-soluble, partially hydrolyzed polyvinyl acetate (PHPVA) combined with potassium silicate, with or without another alkaline potassium salt, is used in a preferred embodiment of the present invention. In general, a composition within that embodiment will contain by weight about 20 to 100 parts of PHPVA, about 25 to 90 parts of potassium silicate, and 0 to about 90 parts of another alkaline potassium salt, such as potassium carbonate. A more preferred composition will contain about 40 to 70 parts of PHPVA, about 20 to 50 parts of potassium silicate, and about 10 to 40 parts of potassium carbonate. A most preferred composition is 70 parts PHPVA, 20 parts potassium silicate, and 10 parts potassium carbonate.

The ingredients that make up the compositions useful in this invention may be introduced into the skin-forming fluid in a variety of ways. For example, they may be combined by simple blending to form an additive mixture, commonly referred to as a premix, for later incorporation into the fluid, or each ingredient may be added separately as the fluid is being prepared, with order of addition being discretionary.

In the most straightforward embodiment of the method in accordance with the invention, the skin-forming fluid reacts with divalent ions naturally present in the formation. Many potentially hydrocarbon-producing formations contain fairly high levels of calcium and magnesium ions, and these divalent ions react rapidly on contact with the skin-forming fluid to generate a barrier at and near the wellbore surface. The overall process of cementing a well in accordance with this embodiment of the invention involves placing a casing or liner in the wellbore along the length of the portion of the wellbore to be cemented. By conventional use of tubing and packers, a skin-forming fluid is pumped down the wellbore into the annulus between the casing or liner and the wellbore wall. The skin-forming fluid reacts with divalent ions in the formation fluids to produce a barrier at the wellbore surface and possibly a slight distance into the formation. After formation of the barrier, cement is pumped into the annulus, displacing the skin-forming fluid. While the cement is hardening, inflow of formation gas is restricted by the barrier, reducing or eliminating channeling in the unset cement. The barrier also prevents water loss from the unset cement into the formation, thus reducing the chances of weak spots in the cement. After the cement is set, the well may be completed in a conventional manner by perforating the casing and cement adjacent to the potential producing zone and by installation of production tubing.

In another embodiment of the invention, in the case where the formation fluids might not contain sufficient divalent ions to thoroughly react with and set the skin-forming fluid, a preflush solution containing divalent ions such as calcium and/or magnesium ions is injected ahead of the skin-forming fluid, preferably a slight distance into the formation. The procedure then is basically the same as for a formation that naturally contains sufficient divalent ions.

We claim:

1. In a method of cementing a casing in a wellbore penetrating a potentially hydrocarbon-producing formation wherein a casing extends into said wellbore and cement is pumped down said wellbore and back up the outside of said casing into the annulus between said casing and the wall of said wellbore at least over the portion of said wellbore traversing said potentially hydrocarbon-producing formation, the improvement comprising:

(a) prior to placing said cement in said annulus, contacting the portion of said wellbore wall traversing said potentially hydrocarbon-producing formation with a skin-forming fluid comprised of one or more water-soluble high molecular weight polyfunctional polymers capable of forming several nucleophilic sites when treated with base, and an effective quantity of one or more potassium salts whose anions are Bronsted-Lowry bases of sufficient strength to raise the pH of the resultant fluid to above 9.0 but which are relatively weak nucleophiles compared to the polymeric nucleophilic sites, thereby forming a substantially impermeable skin on said wellbore wall by reaction of said skin-forming fluid with divalent ions present in said formation, whereby influx of formation fluids is reduced or eliminated while said cement hardens.

2. The method of claim 1 wherein said divalent ions are naturally present in formation waters adjacent to said borehole.

3. The method of claim 1 wherein said divalent ions are present in a preflush fluid injected into said annulus prior to injection of said skin-forming fluid.

4. The method of claim 1 wherein said polymer/salt composition comprises 70 percent by weight partially hydrolyzed polyvinyl acetate, 20 percent by weight potassium silicate, and 10 percent by weight potassium carbonate.

5. The method of claim 4 wherein said polymer/salt composition is present in said skin-forming fluid in a concentration between 0.3 and 2.0 percent by weight.

* * * * *